United States Patent [19]
Ono et al.

[11] Patent Number: 5,706,146
[45] Date of Patent: Jan. 6, 1998

[54] CASSETTE DETECTING AND DISCRIMINATING ARRANGEMENT IN A CASSETTE TRANSPORT MECHANISM FOR LOADING AND UNLOADING TAPE CASSETTES OF VARYING SIZES AND CASSETTES FOR USE THEREWITH

[75] Inventors: Seiji Ono, Yokohama; Nobuyuki Kaku, Naka-gun; Noriaki Masuda, Yokohama; Yoshimi Maehara, Ootsu; Mikihisa Inoue, Otokuni-gun, all of Japan

[73] Assignees: Hitachi Maxell, Ltd., Osaka; Hitachi, Ltd., Tokyo, both of Japan

[21] Appl. No.: 443,764

[22] Filed: May 18, 1995

Related U.S. Application Data

[63] Continuation of Ser. No. 946,615, Sep. 18, 1992, abandoned.

[30] Foreign Application Priority Data

Sep. 20, 1991 [JP] Japan .................... 3-241081

[51] Int. Cl.$^6$ .................... G11B 15/675; G11B 23/087
[52] U.S. Cl. .................... 360/94; 360/96.5; 360/132; 242/336; 242/338; 242/338.4; 242/347
[58] Field of Search .................... 360/94, 96.5, 71, 360/69, 132; 242/336, 338, 338.4, 347

[56] References Cited

U.S. PATENT DOCUMENTS

| | | | |
|---|---|---|---|
| 4,268,877 | 5/1981 | Moris et al. | 360/94 |
| 4,424,540 | 1/1984 | Naoi | 360/71 |
| 4,786,996 | 11/1988 | Ohtani et al. | 360/94 |
| 4,803,575 | 2/1989 | Nishimura et al. | 360/94 |
| 4,853,805 | 8/1989 | Baranski | 360/94 |
| 4,853,916 | 8/1989 | Tomita | 360/99.07 |
| 4,864,439 | 9/1989 | Duurland | 360/132 |
| 4,886,550 | 12/1989 | Ohashi et al. | 360/94 |
| 4,965,683 | 10/1990 | Otani | 360/96.5 |
| 5,016,127 | 5/1991 | Inoue et al. | 360/94 |
| 5,032,939 | 7/1991 | Mihara et al. | 360/94 |
| 5,034,831 | 7/1991 | Miyawaki et al. | 360/94 |
| 5,121,268 | 6/1992 | Nakayama et al. | 360/71 |
| 5,121,271 | 6/1992 | Sakumoto et al. | 360/94 |
| 5,151,835 | 9/1992 | Nakanishi | 360/96.5 |
| 5,240,200 | 8/1993 | Nishimura et al. | 360/96.5 |

FOREIGN PATENT DOCUMENTS

| | | |
|---|---|---|
| 0286751 | 10/1988 | European Pat. Off. . |
| 0 335271 | 10/1989 | European Pat. Off. . |
| 0 374899 | 6/1990 | European Pat. Off. . |
| 0 419195 | 3/1991 | European Pat. Off. . |
| 0 435267 | 7/1991 | European Pat. Off. . |
| 64-42061 | 2/1989 | Japan . |
| 3-192589 | 8/1991 | Japan .................... 360/96.5 |
| WO89/04539 | 5/1989 | WIPO . |

*Primary Examiner*—Craig A. Renner
*Attorney, Agent, or Firm*—Birch, Stewart, Kolasch & Birch, LLP

[57] ABSTRACT

A cassette transport configuration provides a cassette insertion slot for introducing a cassette cartridge, guide rails for guiding and positioning each cassette cartridge and a plurality of cassette detecting elements for detecting the correct positioning of each cassette. The detecting elements are spaced apart on an upper inner portion of the insertion slot.

4 Claims, 14 Drawing Sheets

CASSETTE DETECTING AND DISCRIMINATING ARRANGEMENT IN A CASSETTE TRANSPORT MECHANISM FOR LOADING AND UNLOADING TAPE CASSETTES OF VARYING SIZES AND CASSETTES FOR USE THEREWITH

This application is a continuation of application Ser. No. 07/946,615 filed on Sep. 18, 1992, now abandoned.

BACKGROUND OF THE INVENTION

1. Field of the Invention

The present invention relates to an audio and video device using a magnetic tape cassette, and more particularly to a cassette transport mechanism for loading and unloading a magnetic tape cassette.

2. Description of the Related Art

There has been known a cassette loading system capable of loading each of different types of cassettes into a VTR (Video Tape Recorder).

Such a conventional cassette transport mechanism is disclosed, for example, in the Japanese Patent Application Laid-Open Publication No. Sho-64-42051.

FIG. 1 shows an example of a conventional cassette transport mechanism capable of loading and unloading two types of cassettes having an identical height T but different widths L and depths W see FIGS. 2 and 3.

FIGS. 2 and 3 show conventional cassettes for use in the conventional cassette transport mechanism shown in FIG. 1, where FIG. 2 shows the cassette 10f for regular use and FIG. 3 shows the cassette 10g for long-play use. When either type of cassette 10f and 10g is inserted into the cassette transport mechanism, it is discerned whether the inserted cassette is a regular type 10f or a long-play type 10g. Then a reel base for receiving the reels of the cassette in the VTR is moved in such a manner that the reel interval of the reel base corresponds to the distance between the two reels of the inserted cassette, thereby to enable subjecting each of the two types of cassettes to recording and playback in an identical VTR.

In order to subject each of the two types of the cassettes 10f and 10g to recording or playback, it is necessary to make constant the relationship of the relative position between each of the two types of the cassettes and the cassette transport mechanism. For the above-mentioned purpose, a guide groove 14 is formed in the exterior bottom of each of the cassettes, as shown in FIGS. 2 and 3. On the other hand, a guide rail 15 is provided at the bottom of the cassette insertion portion in the cassette transport mechanism in such a projected form that the guide rail fits in the cassette guide groove 14 of the inserted cassette, as shown in FIG. 1, so that the guide groove 14 is to be engaged with the guide rail 15 to enable inserting either the cassette 10f or the cassette 10g in a prescribed position in the cassette transport mechanism.

The above-mentioned VTR is used in a broadcasting station or a similar place. Meanwhile, in a VTR for home use, only one cassette type is used, and therefore no guide groove 14 is provided in the home-use cassette.

Henceforth, the amount of data to be recorded wall significantly increase as the video technology develops. As a consequence of recording more data, the tape consumption amount will, of course, increase. Therefore, the cassette size is required to be increased, and a plurality of cassette types having different lengths and widths will be produced to cope with different recording time.

It is also anticipated that a cassette having a different height will be produced for the purpose of increasing the rigidity and improving the dustproof capability of a cassette half while keeping the same tape width. In order to subject each of sch cassettes having different dimensions in size to recording and playback in an identical VTR, it has been necessary to provide the same guide or positioning groove as described above An the conventional example in every cassette. However, conventional cassettes have been produced only in consideration of the compatibility between cassettes each having a guide groove, i.e., there has been made no consideration for the compatibility between cassettes having a guide groove and cassettes having no guide groove.

SUMMARY OF THE INVENTION

Accordingly, an essential objective of the present invention is to provide a cassette transport mechanism capable of loading and unloading either of a plurality of cassettes each having a guide groove and a plurality of cassettes each having no guide groove while permitting a variety of cassette dimensions in width, depth, and height, and to provide such cassettes for use in the mechanism.

In order to achieve the above-mentioned objective, there are provided a pair of projecting portions on a cassette tray, the interval between the projecting portions of the cassette tray being dimensionally arranged for alignment and engagement with guide grooves formed in the exterior bottom of a large type cassette so that the interval between the protecting portions approximately coincides with the width of a small type cassette, and, for cassettes having different heights, there are formed groove portions dimensionally arranged in the exterior bottom of each of the cassettes so that a constant tape center height can be achieved in each of the recording and playback stages.

According to a feature of the present invention, a small type cassette is to be inserted between the above-mentioned projecting portions provided on the cassette tray apart by a distance approximately equal to the width of the cassette to enable positioning the small type cassette with the side surfaces of the cassette checked by the protecting portions. With regard to a large type cassette, a pair of guide grooves are provided in the exterior bottom of the cassette to make the guide grooves serve as positioning grooves. Since the insertion positions of small type cassettes having different widths and heights are not unitarily fixed, the insertion position of each cassette is detected by detector means to Judge whether the cassette is inserted in the correct position.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
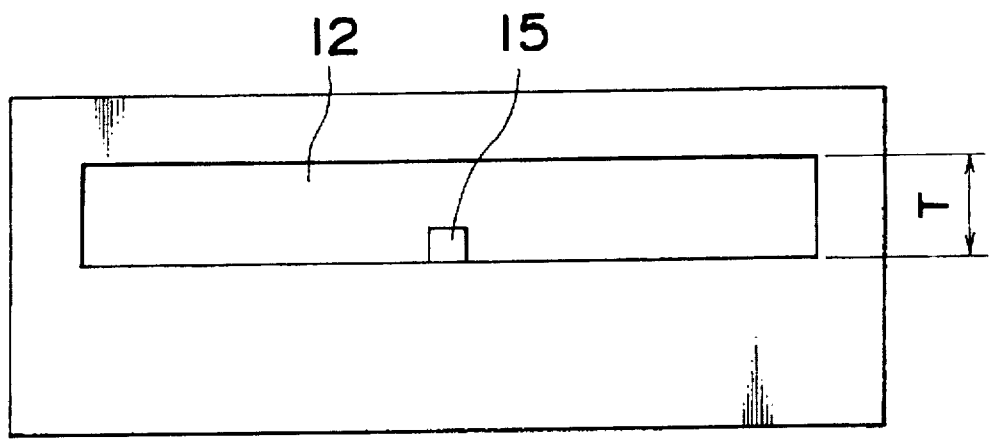
FIG. 1 is a front view of a conventional cassette transport mechanism reflecting the use of an insertion slot.
Figure 2A:
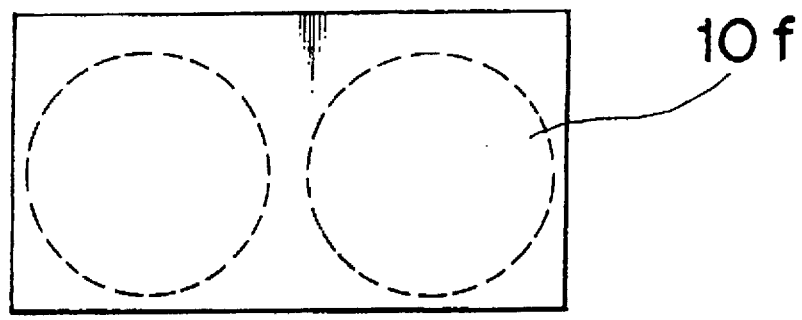
FIGS. 2 (a) and 2 (b) are schematic views of a conventional cassette for regular use.
Figure 2B:
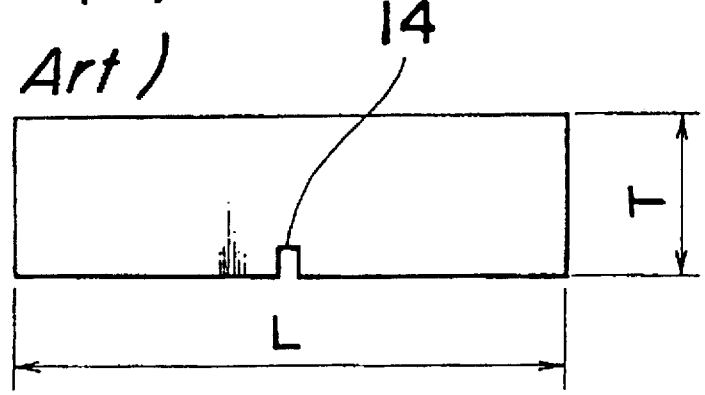
Figure 3A:
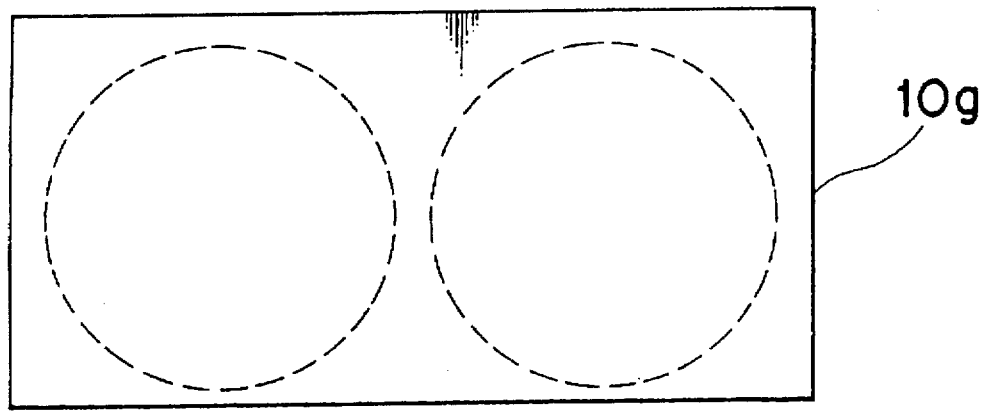
FIGS. 3 (a) and 3 (b) are schematic views of a conventional long-play cassette.
Figure 3B:
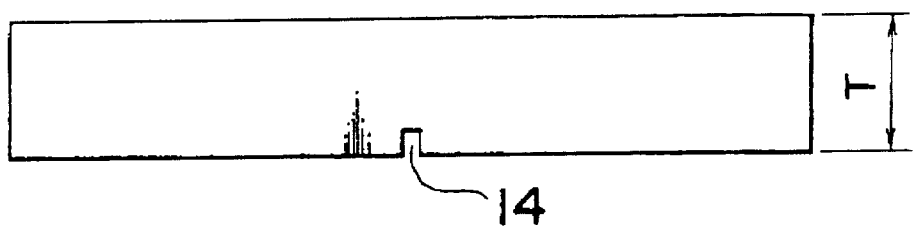

Before the description proceeds, it is noted that since the basic structure of the preferred embodiment of a tape transfer mechanism and cassettes therefor is similar to that of the conventional one, like parts are designated by like reference numerals throughout the drawings.

The following describes an embodiment of the present invention with reference to the attached drawings.

The first embodiment to be described as follows is a cassette loading mechanism capable of loading either a cassette having no guide groove or a cassette having a pair of guide grooves formed in the exterior bottom of the cassette.

Figure 4A:
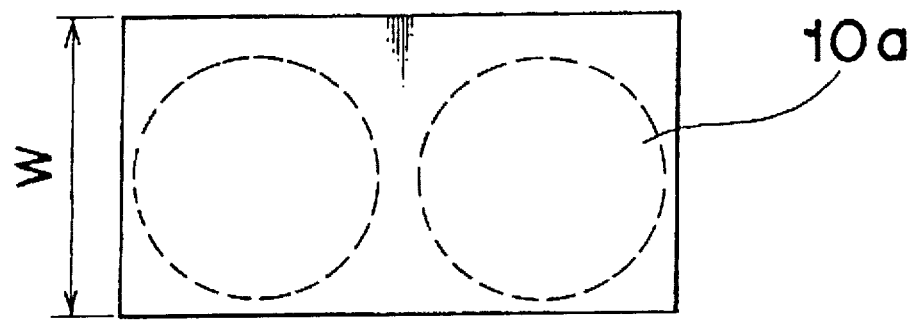
FIGS. 4 (a) and 4 (b) are schematic views of a regular cassette having no guide groove.
Figure 4B:
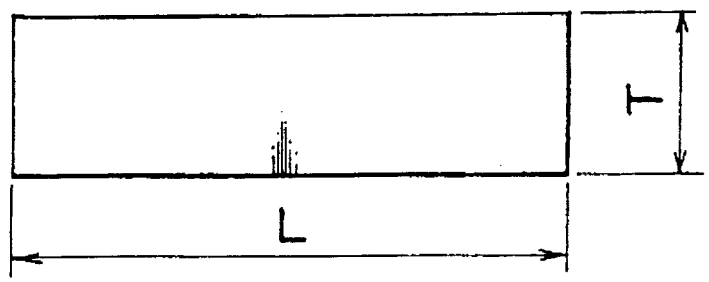

FIGS. 4 (a) and 4 (b) show a regular type cassette 10a having a width L, depth W, and height T which is not provided with a guide groove in the exterior bottom thereof.

Figure 5A:
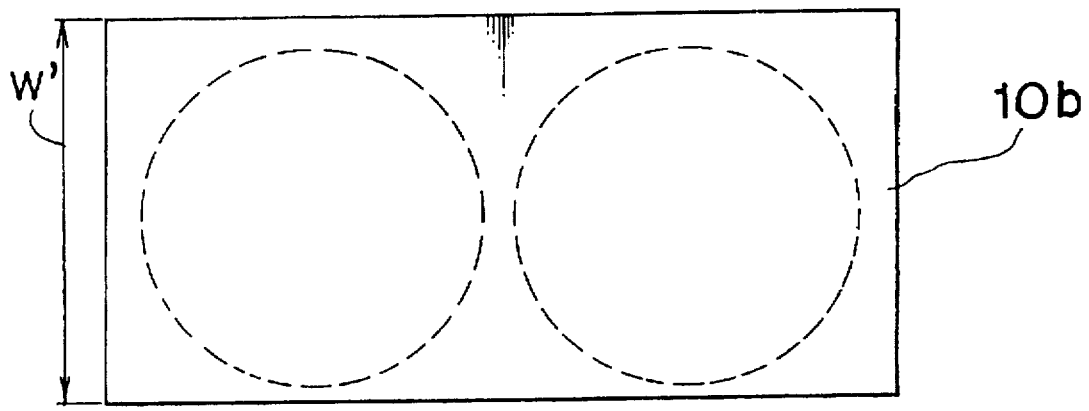
FIGS. 5 (a) and 5 (b) are Schematic views of a long-play cassette having guide grooves.
Figure 5B:
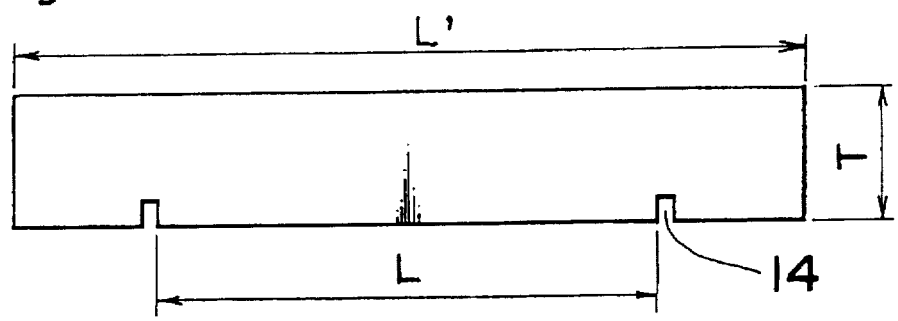

FIGS. 5 (a) and 5 (b) show a long-play cassette 10b having a width L' greater than the width L, a depth W' greater than the depth W, and a height T identical to that of the regular type cassette 10a. The long-play cassette 10b is provided with a pair of guide grooves 14 in the depthwise direction apart by a distance L in the exterior bottom of the cassette.

Figure 6:
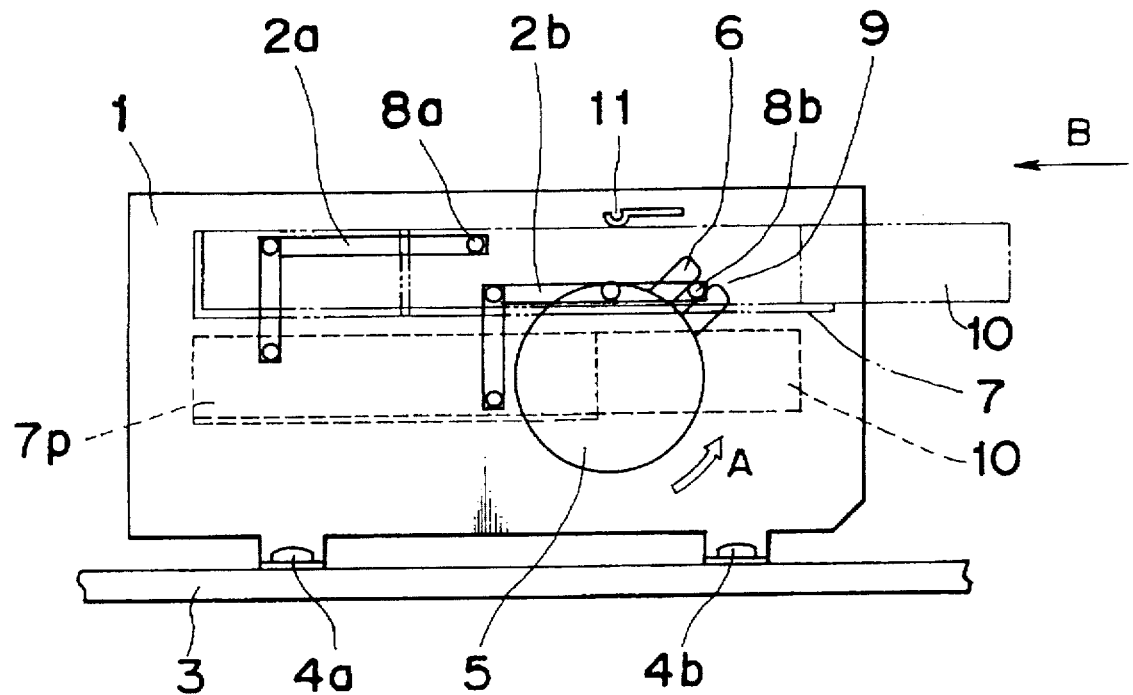
FIG. 6 is a side view of a cassette transport mechanism of the present invention.

FIG. 6 shows a cassette loading and unloading mechanism of a VTR in accordance with an embodiment of the present invention.

Referring to FIG. 6, a guide plate 1 having two L-shaped grooves 2a and 2b formed therein is fixed to a main chassis 3 of the VTR by means of setscrews 4a and 4b.

A drive gear 5 with a drive arm 6 connected thereto is mounted to the guide plate 1 so as to be coaxially rotatable.

A cassette tray 7 is provided with guide pins 8a and 8b which are respectively interposed in the L-shaped grooves 2a and 2b of the guide plate 1, and the guide pin 8b is further interposed in a U-shaped groove 9 defined by the drive arm 6.

In FIG. 6, when a cassette 10 is manually inserted into the VTR and loaded on the cassette tray 7, the cassette 10 is securely pressed against the cassette tray 7 by a cassette spring 11 (the member for fixing the spring 11 being not shown) which is attached to the cassette tray 7. The cassette 10 securely loaded on the cassette tray 7 is detected by a cassette loading switch (not shown) and then a drive motor (not shown) is driven to rotate the drive gear 5 together with the drive arm 6 attached thereto in the direction indicated by an arrow A in FIG. 6. With the rotation of the drive arm 6, the guide pin 8b is driven to move the cassette tray 7 horizontally and both the guide pins 8a and 8b of the cassette tray 7 are guided along the two L-shaped guide grooves 2a and 2b of the guide plate 1 and then the cassette tray 7 is moved downward to a position 7p for recording and playback to complete the operation of loading the cassette 10 into the VTR deck.

When unloading the cassette 10 from the VTR, the drive motor (not shown) is reversibly rotated to reverse the above-mentioned motions to remove the cassette 10.

Figure 7:
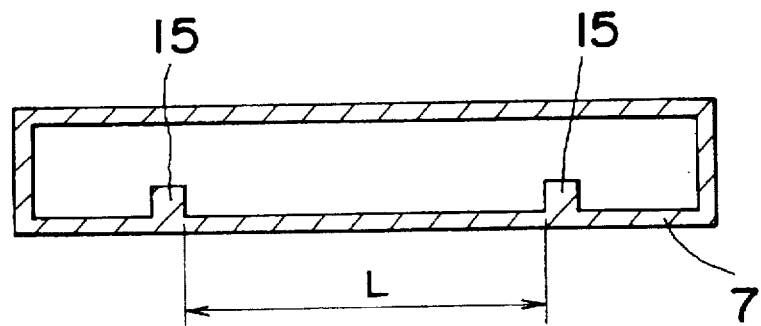
FIG. 7 is a schematic view of a cassette insertion slot of the cassette transport mechanism of the present invention.

FIG. 7 shows a cassette insertion slot of the cassette transport means when viewed in the direction as indicated by the arrow B in FIG. 6. Referring to FIG. 7, a pair of projecting portions (referred to as "guide rails" hereinafter) 15 for positioning a cassette are provided apart by a distance L on the cassette tray 7. When inserting the regular type cassette 10a having no guide groove as shown in FIGS. 4 (a) and 4 (b) into the cassette insertion slot, since the width of the cassette 10a coincides with the interval L between the guide rails 15 on the cassette tray 7, the cassette 10a can be inserted between the guide rails 15 to be positioned with accuracy.

When inserting the long-play cassette 10b as shown in FIGS. 5 (a) and 5 (b) into the cassette insertion slot of the VTR, the cassette lob can be positioned by aligning the guide rails 15 of the cassette tray 7 to be engaged with the guide grooves 14 apart by a distance L of the cassette 10b. Although not shown, a cassette having a greater width than the width L' of the cassette lob can be also inserted in the prescribed position by forming guide grooves 14 apart by a distance L in the exterior bottom of such a cassette. By providing the guide rails 15 at the right and left positions on the Cassette tray 7, any cassette can be inserted stably.

The following describes the configuration of the guide rails 15.

Figure 8:
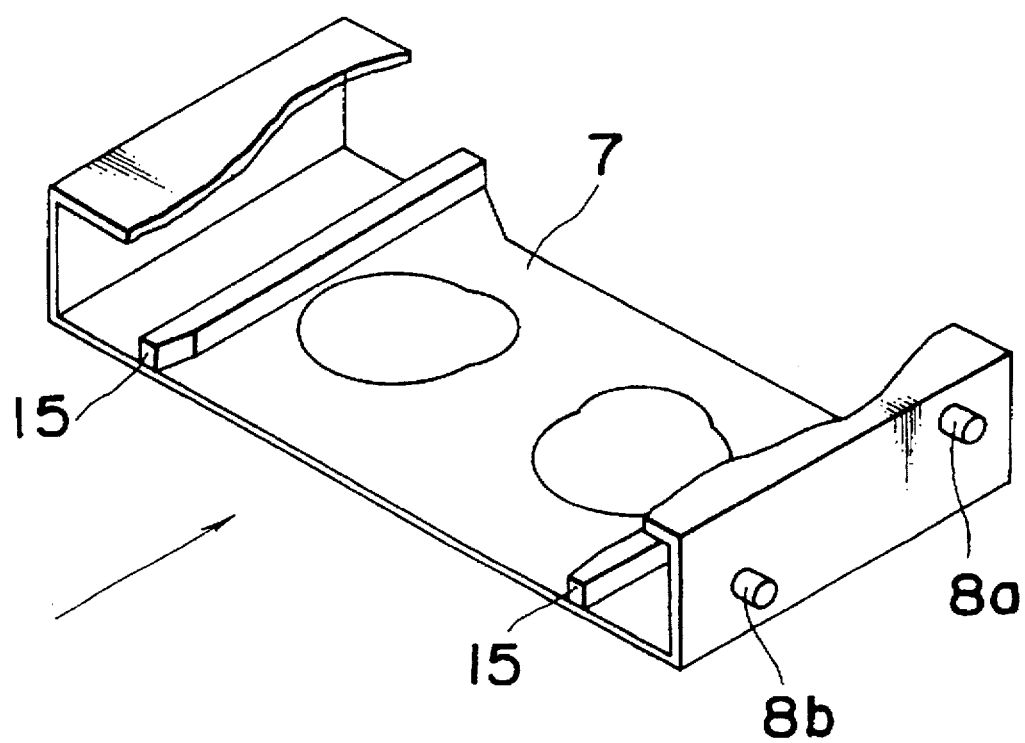
FIG. 8 is a perspective view of a guide rail of a cassette loading mechanism in accordance with the present invention.

FIG. 8 shows a perspective view of a slot-in type cassette tray 7 where the Cassette receiving ends of the guide rails 15 are narrowed, in other words, the interval between the guide rails 15 at the cassette receiving portion are spread to facilitate inserting the regular type cassette 10a into the VTR.

Figure 9:
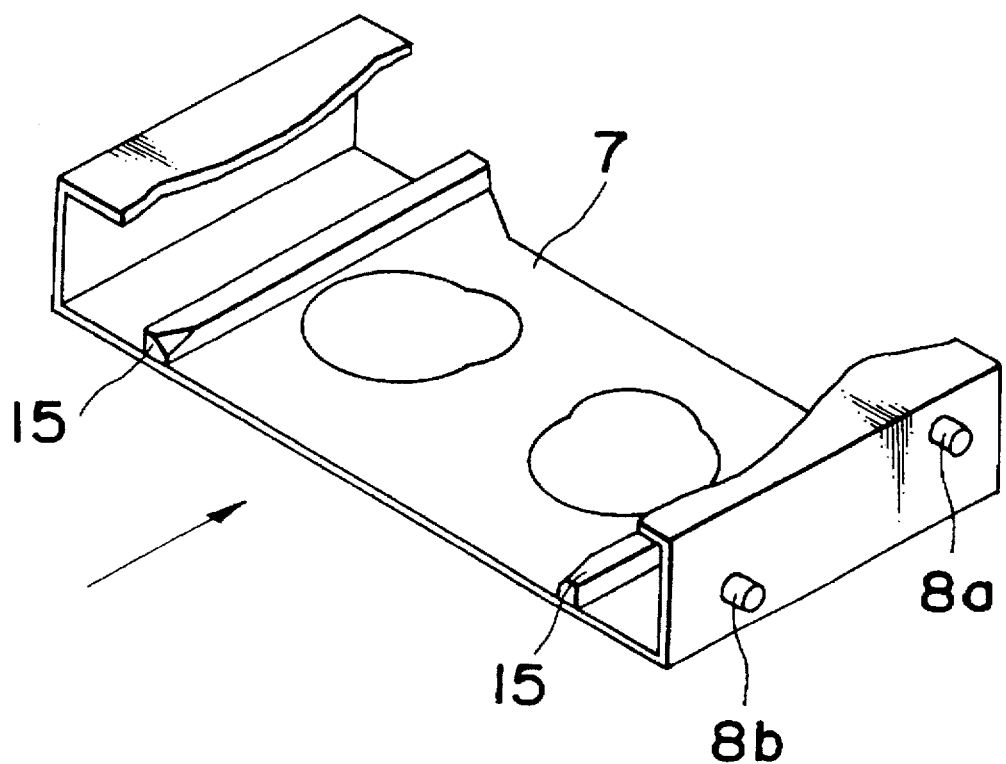
FIG. 9 is a perspective view of a guide rail of an alternate embodiment of a cassette loading mechanism of the present invention.

FIG. 9 shows exemplified guide rails 15 of which cassette receiving ends are chamfered to facilitate inserting the cassette 10a. The chamfering may be also replaced by rounding to produce the same effect.

Figure 10A:
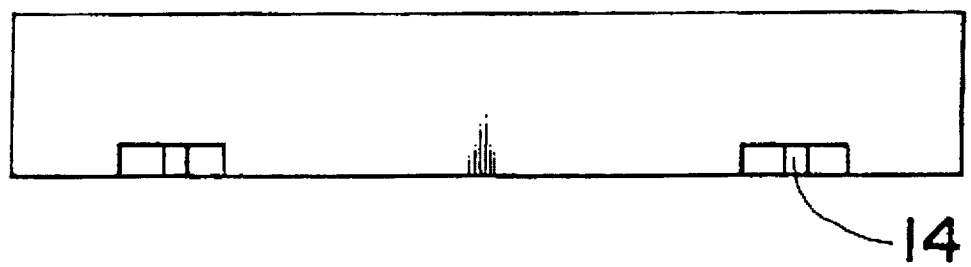
FIGS. 10 (a) and 10 (b) are schematic views of guide grooves of a cassette of the present invention.
Figure 10B:
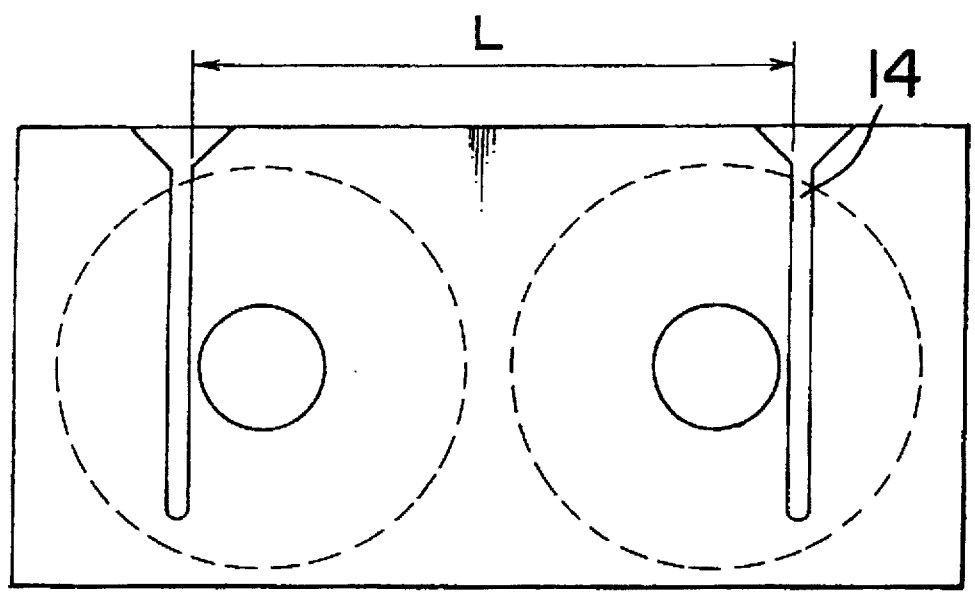

FIG. 10 (b) shows a bottom view of a cassette having guide grooves 14. By partially spreading the widths of the guide grooves 14 at the leading ends for insertion, the guide rails 15 of the cassette tray 7 do not impede the entrance of the guide grooves 14 of a cassette, even when the cassette insertion position slightly deviates, to thereby enable easy insertion of the cassette.

Figure 11:
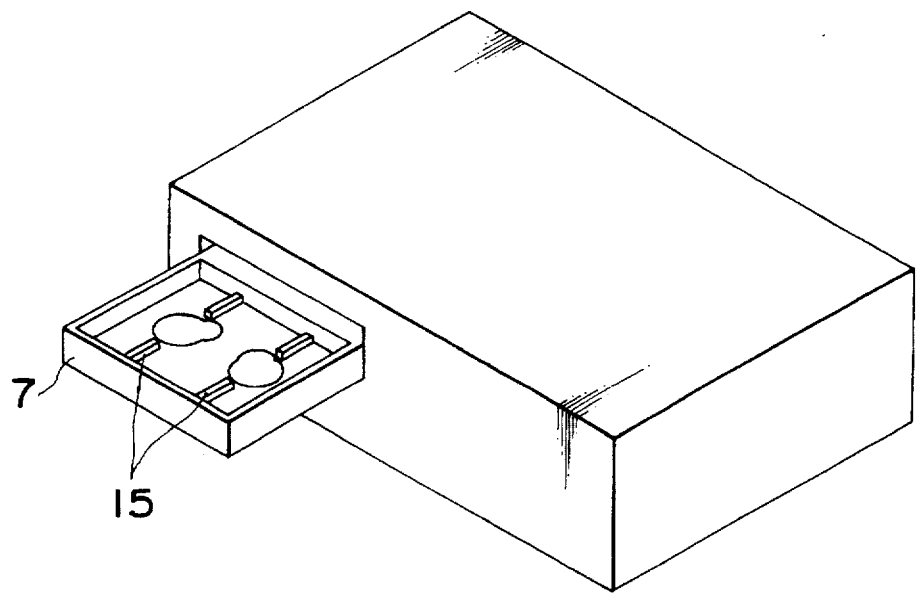
FIG. 11 is a schematic view of a linear skating type embodiment.

FIG. 11 shows a linear skating type cassette tray 7 in contrast to the slot-An type shown in FIG. 1.

Figure 12:
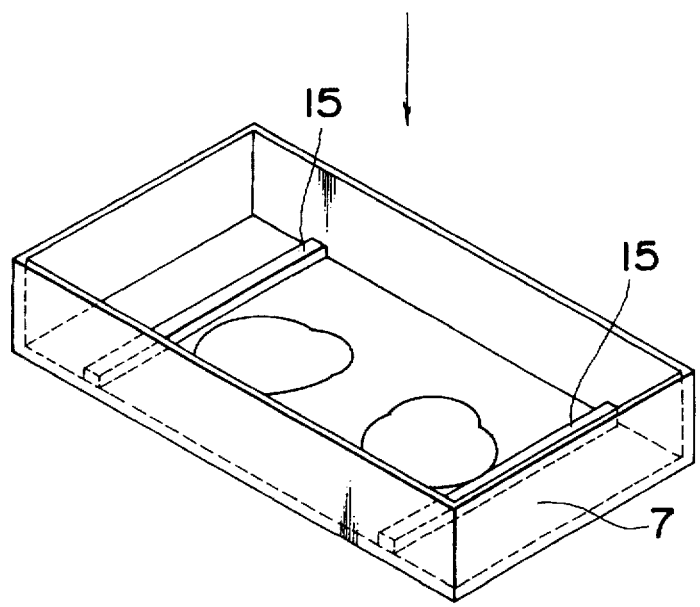
FIG. 12 is a perspective view of a guide rail of a linear skating type cassette loading mechanism of the present invention.

FIG. 12 shows a perspective view of the linear skating type cassette tray 7 which vertically receives a cassette, and therefore the upper surfaces of the guide rails 15 are each chamfered to facilitate fitting the cassette 10a or 10b on the cassette tray 7. It is noted that the guide rails 15 may be rounded instead of being chamfered to produce the same effect.

Figure 13:
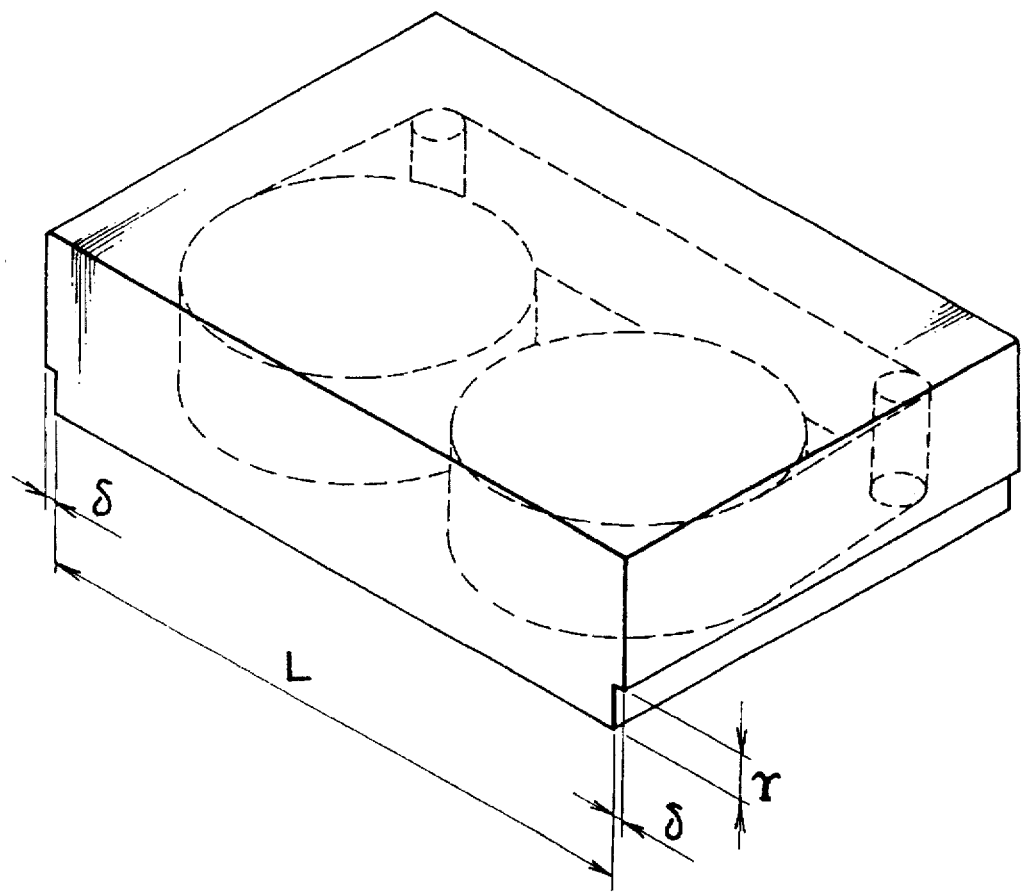
FIG. 13 is a perspective view of a cassette which cannot be inserted upside down into a slot.

FIG. 13 shows a cassette having no guide grooves 14, where the width of the cassette is made greater by 2δ than the interval L between the guide rails 15, except the lower portion of the cassette which is to be guided by the guide rails 15 has a width L thereby to prevent the cassette from being inserted upside down. Each cut-off portion of δ has a height γ greater than the height of each of the guide rails 15 (the length 2δ distributed to both sides of the cassette in FIG. 13 may be alternatively provided on one side of the cassette).

The following describes the case where cassettes having different heights are compatibly used in one cassette transport mechanism.

Figure 14A:
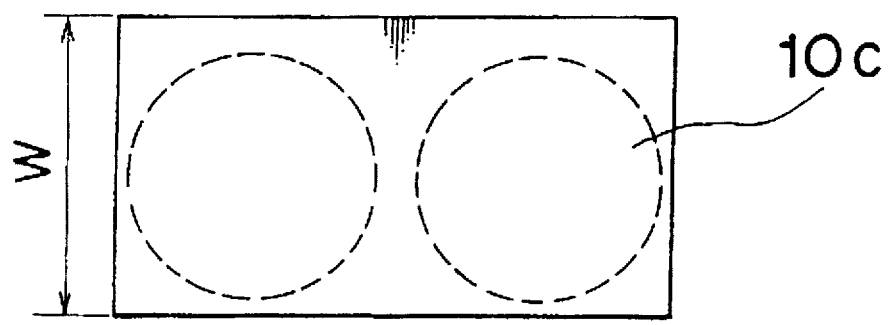
FIGS. 14 (a) and 14 (b) are schematic views of a regular cassette having a greater height.
Figure 14B:
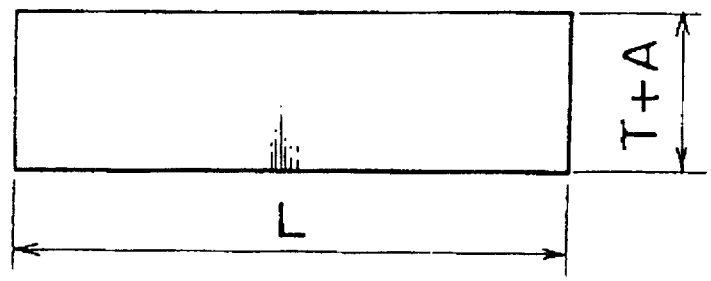

FIGS. 14 (a) and 14 (b) show a cassette 10c having a width L, a depth W, and a height T+A, which is not provided with a guide groove in the exterior bottom of the cassette 10c.

Figure 15A:
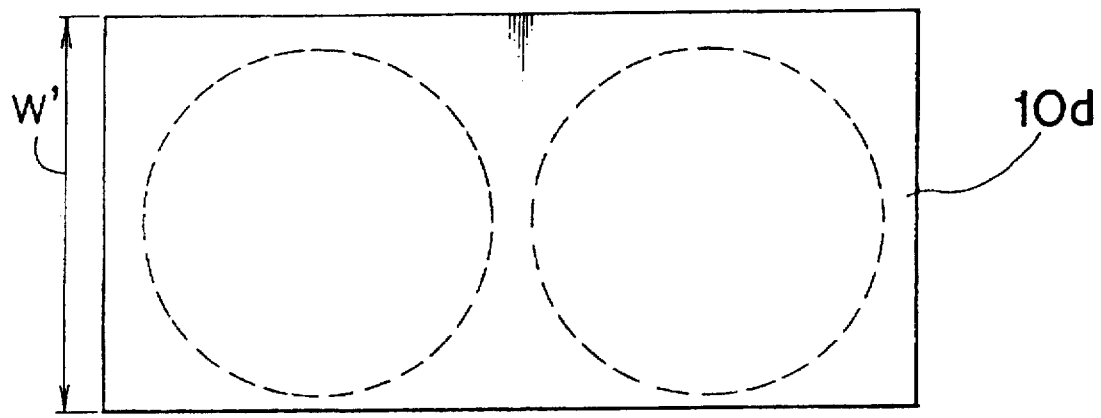
FIGS. 15 (a) and 15 (b) are schematic views of a long-play cassette having a greater height.
Figure 15B:
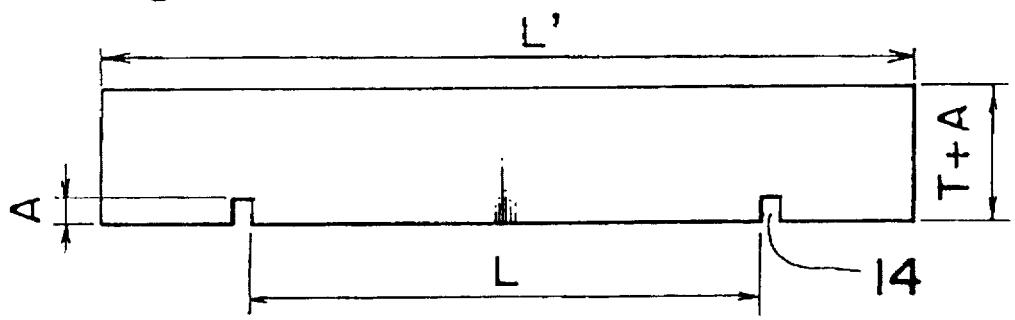

FIGS. 15 (a) and 15 (b) shows a cassette 10d having its width L' greater than L, depth W' greater than W, and height T+A which is provided with guide grooves 14 apart by distance L in the exterior bottom of the cassette 10d.

Figure 16:
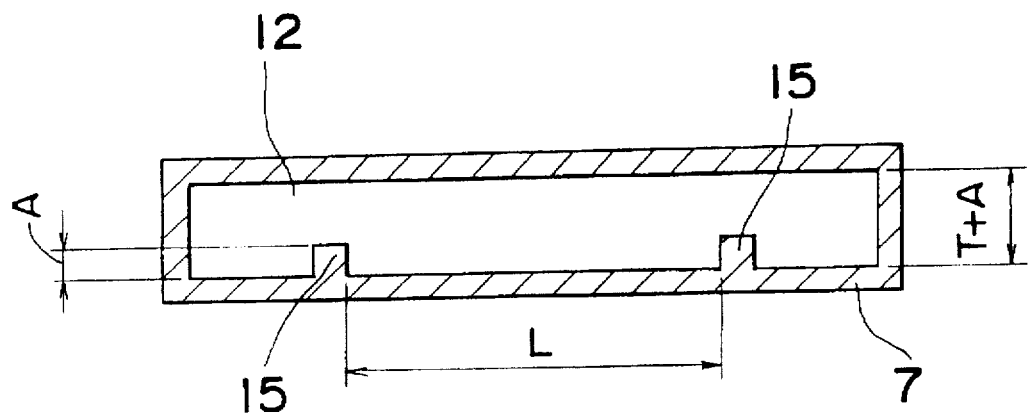
FIG. 16 is an explanatory view of a cassette loading mechanism in accordance with a first embodiment of the present invention.

FIG. 16 shows the cassette insertion slot of a cassette transport means of the present invention in the same manner as in FIG. 7. In FIG. 16, a cassette transport mechanism receives each of the cassettes 10a and 10b having their height T as shown In FIGS. 4 and 5 as well as the cassettes 10c and 10d having the height T+A as shown in FIGS. 14 and 15.

Referring to FIG. 16, the height of a cassette insertion slot 12 is approximately T+A, the height of each of the guide rails 15 is approximately A, and the interval between the guide rails is L. Therefore, the regular cassette 10c having a great height T+A and no guide groove as well as the long-play cassette 10d having a great height T+A and guide grooves 14 can be each inserted only into the predetermined position in the cassette insertion slot 12.

When inserting the cassette 10a or 10b having the height T, each of the cassettes 10a and 10b cannot have a fixed insertion position since the cassette insertion slot 12 has a height greater by the dimension A than the height of each of the cassettes. However, by making each of the guide rails have a height of approximately A, the gap in height between the guide rails 15 and the cassette insertion slot 12 is made equal to the cassette height T at its narrowest portion. Therefore, the cassette 10a is naturally inserted into a wide space between the guide rails 15. The cassette 10b can be also inserted most easily into the cassette insertion slot 12 when the guide grooves 14 are aligned with the guide rails 15, in which condition the clearance between the Cassette 10b and the cassette insertion slot 12 is greatest.

When the height of each of the guide rails is smaller than the difference A in height between the cassette insertion slot and the cassette, each of the cassettes 10a and 10b can be inserted into any space in the cassette insertion slot 12, which means that each cassette may not be set in the correct position.

Figure 17:
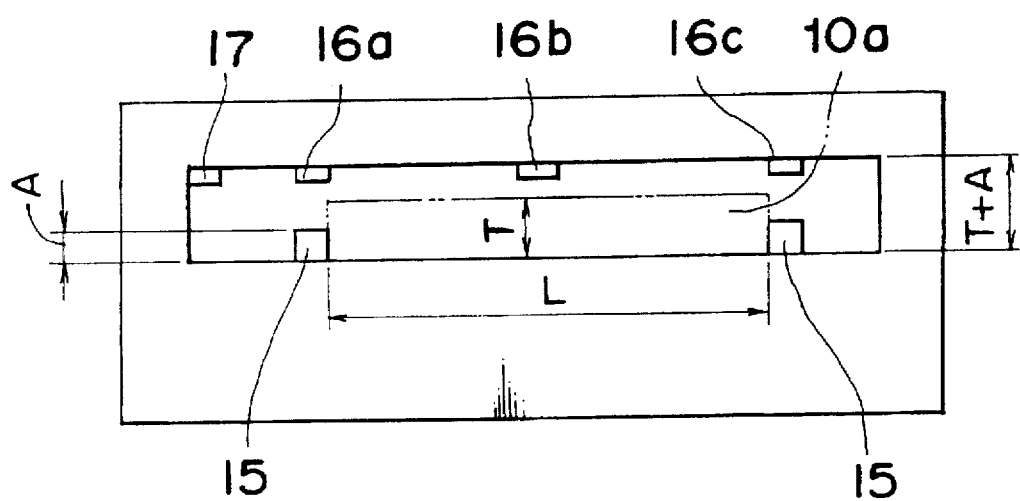
FIG. 17 is an explanatory view of a cassette loading mechanism in accordance with a second embodiment of the present invention.

Therefore, the cassette position is detected by means of cassette detectors 16a, 16b, and 16c provided on the upper inner wall of the cassette insertion slot as shown in FIG. 17. The detectors 16a and 16c oppose the right and left guide rails 15 respectively and the detector 16b is interposed between the detectors 16a and 16c. The detection signals obtained from the detectors are discriminated by a discriminator 17. When the cassette position is correct, the cassette is to be loaded into the VTR. When the cassette position is not correct, a signal indicating that the cassette position is not correct is generated by the discriminator 17.

The above-mentioned cassette insertion actions are described as follows with regard to the low-height cassettes 10a or 10b. When the cassette 10a or 10b is inserted into the correct position, the detectors 16a, 16b, and 16c are all turned off. When the insertion positions of the cassettes 10a and 10b are incorrect, the detector 16a or 16c is turned on to detect that the cassette is inserted in an incorrect position.

As described above, either the Cassette having a guide groove or the cassette having no guide groove can be used in an identical VTR, and furthermore a cassette having a different height can be used. This is important to assure compatibility between a new system and the conventional system. In the above regard, the present invention is capable of using conventional cassettes to enable effective use of all such cassettes.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A cassette transport mechanism for loading and unloading tape cassettes of various sizes into a recording and/or playback unit, said transport mechanism comprising:

cassette transport means for transporting a first type grooveless tape cassette having a width L and a height T, a second type tape cassette having said height T and a width L' greater than said width L and provided with a pair of grooves formed in an exterior bottom of said second type tape cassette, a third type grooveless tape cassette having said width L and a height T+A greater than said height T, and a fourth type tape cassette having said height T+A and said width L' and provided with a pair of grooves formed in an exterior bottom of said fourth type tape cassette, individually from a first loading position to a second position for a recording or playback operation, said cassette transport means including a cassette tray provided with a pair of projecting portions formed thereon as first and second guide rails in a depthwise direction corresponding to a cassette insertion direction for guiding each cassette, a cassette insertion slot having approximately said height T+A for receiving each of said tape cassettes, said projecting portions being positioned apart widthwise by said width L for guiding either said first or third type grooveless tape cassette between said guide rails or said second or fourth type tape cassette over said guide rails within said grooves of said second or fourth type tape cassette into said cassette insertion slot, and a plurality of cassette detecting means provided at an upper inner portion of said cassette insertion slot for providing detection signals for determining the correct position of said cassette inserted into said cassette insertion slot before loading of said cassette into said recording and/or playback unit, said plurality of cassette detecting means comprising first, second and third cassette detectors provided at said upper inner portion of said cassette insertion slot, said first cassette detector being spaced directly above said first guide rail, said second cassette detector being spaced directly above said second guide rail, and said third cassette detector being located between said first cassette detector and said second cassette detector, wherein said cassette transport means further includes discrimination means for discriminating whether a cassette has been incorrectly inserted into said cassette tray by means of said detection signals obtained from said plurality of cassette detecting means, whereby one of said first and second cassette detectors is activated when one of said tape cassettes having said height T is incorrectly inserted into said insertion slot, and said first and second cassette detectors are not activated when said one of said tape cassettes having said height T is correctly inserted into said insertion slot.

2. The cassette transport mechanism as in claim 1, wherein cassette receiving ends of said guide rails provided on said cassette tray are narrowed, chamfered or rounded at said cassette insertion slot of said cassette tray.

3. The cassette transport mechanism as in claim 1, further including in combination therewith said second type tape cassette, wherein said grooves of said second type tape cassette are partially spread at leading ends thereof for insertion on said guide rails of said cassette tray.

4. The cassette transport mechanism as in claim 1, further including in combination therewith said first type grooveless tape cassette having an upper portion and a lower portion narrower than said upper portion, said lower portion having said width L which is to be guided between said pair of guide rails, said upper portion having a width greater than said width L, said lower narrower portion having a height greater than a height of each of said guide rails.

* * * * *